(12) United States Patent
Hibbs

(10) Patent No.: US 12,345,051 B2
(45) Date of Patent: Jul. 1, 2025

(54) PANEL MOUNTING SYSTEM

(71) Applicant: REFORM SYSTEMS LTD., Buckinghamshire (GB)

(72) Inventor: Colin Dennis Hibbs, Hertfordshire (GB)

(73) Assignee: REFORM SYSTEMS LTD., Buckinghamshire (GB)

( * ) Notice: Subject to any disclaimer, the term of this patent is extended or adjusted under 35 U.S.C. 154(b) by 0 days.

(21) Appl. No.: 18/009,259

(22) PCT Filed: Jun. 9, 2021

(86) PCT No.: PCT/EP2021/065440
§ 371 (c)(1),
(2) Date: Dec. 8, 2022

(87) PCT Pub. No.: WO2021/250085
PCT Pub. Date: Dec. 16, 2021

(65) Prior Publication Data
US 2023/0258000 A1    Aug. 17, 2023

(30) Foreign Application Priority Data

Jun. 10, 2020 (GB) .................................... 2008801

(51) Int. Cl.
*E04F 13/08* (2006.01)
(52) U.S. Cl.
CPC .................. *E04F 13/0821* (2013.01)
(58) Field of Classification Search
CPC ........ E04B 1/388; E04B 1/185; E04F 13/083; E04F 13/0821; F16B 21/02; F16B 7/0473; F16B 2/243
See application file for complete search history.

(56) References Cited

U.S. PATENT DOCUMENTS

| 3,577,694 A | 5/1971 | Omholt |
| 5,375,798 A * | 12/1994 | Hungerford, Jr. ...... F16L 3/243 248/68.1 |

(Continued)

FOREIGN PATENT DOCUMENTS

| CN | 112031316 A | 12/2020 |
| EP | 0391737 A1 | 10/1990 |

(Continued)

OTHER PUBLICATIONS

"Notification of Transmittal of International Preliminary Report on Patentability", The International Bureau of WIPO, Dec. 22, 2022.

(Continued)

*Primary Examiner* — Paola Agudelo
(74) *Attorney, Agent, or Firm* — Levenfeld Pearlstein, LLC

(57) ABSTRACT

A connector 100, a rail system (600), and a panel-mounting system (1) for connecting a lateral rail (200) to a longitudinal rail (300). The connector 100 comprising a first portion 110 configured to attach to the lateral rail (200); and a second portion 112 configured to attach to the longitudinal rail (300), the second portion 112 extending perpendicularly from the first portion 110 to form an L-shape with the first portion 110, the second portion 112 comprising a first retaining lip 120*a* for engagement with a first corresponding feature (316) of the longitudinal rail (300), wherein the connector 100 is rotatable between an unlocked orientation, in which the first portion 110 may be freely inserted and removed from the lateral rail 200, and a locked orientation, in which the first portion 110 is secured to the lateral rail 200.

17 Claims, 8 Drawing Sheets

(56) References Cited

U.S. PATENT DOCUMENTS

| | | | | |
|---|---|---|---|---|
| 5,517,731 | A * | 5/1996 | Spykerman | F16B 5/0028 |
| | | | | 52/582.1 |
| 2005/0229529 | A1* | 10/2005 | Frascari | E04F 13/0812 |
| | | | | 52/509 |
| 2013/0205698 | A1* | 8/2013 | Todd | E04B 2/88 |
| | | | | 52/302.1 |
| 2015/0337538 | A1* | 11/2015 | Florenske | E04F 13/0812 |
| | | | | 52/481.1 |
| 2016/0138634 | A1* | 5/2016 | Zhang | E04B 1/5812 |
| | | | | 52/698 |
| 2019/0010969 | A1* | 1/2019 | Winn | E04B 9/16 |
| 2019/0024693 | A1* | 1/2019 | Smith | F16B 21/086 |
| 2019/0211856 | A1* | 7/2019 | Getsiv | F16B 7/0473 |
| 2021/0332594 | A1* | 10/2021 | Steffes | E04F 13/0864 |
| 2022/0106796 | A1* | 4/2022 | Houfflyn | E04F 13/12 |
| 2022/0213988 | A1* | 7/2022 | Wilson | F16B 2/243 |
| 2023/0110456 | A1* | 4/2023 | LeBlang | E04B 2/58 |
| | | | | 248/224.61 |

FOREIGN PATENT DOCUMENTS

| | | | |
|---|---|---|---|
| GB | 1455556 | A | 11/1976 |
| JP | S55159051 | A | 12/1980 |
| JP | H0835313 | A | 2/1996 |

OTHER PUBLICATIONS

"Notification of Transmittal of the International Search Report and The Written Opinion of the International Searching Authority, or the Declaration" Nov. 30, 2021.

* cited by examiner

PANEL MOUNTING SYSTEM

CROSS-REFERENCE TO RELATED APPLICATION DATA

This application is a US national stage application of PCT/EP2021/065440, with an international filing date of Jun. 9, 2021, titled PANEL MOUNTING SYSTEM, which claims the benefit of and priority to Great Britain application GB 2008801.9, filed Jun. 10, 2020, the disclosures of which are incorporated herein in their entireties.

FIELD OF THE INVENTION

The present invention relates to a panel mounting system. More specifically, the present invention relates to a connector and rails for mounting planar components onto a wall, ceiling, roof, or floor.

BACKGROUND

In the fields of construction and mechanical installation, a system of rails and connectors may be used to secure together substantially planar components. This may include, for example, securing panels, protective screens, display screens, cladding, temporary walls, and barriers to walls, ceilings, roofs, floors, or other existing planar structures. In particular, this may include securing wall over-cladding to existing structural and partition walls.

The installation of cladding to existing walls can be a time-consuming and complex process, requiring multiple tools and trained installers. The installation requires consideration of the dimensions of the cladding panels to be installed, as well as the dimensions of the rails, and locations of the connectors. For example, this may require an installer to obtain the dimensions of the panels prior to installation and then to carefully measure the required location of the rails and connectors relative to the existing wall, and relative to the other rails.

When constructing a room or building, it is often necessary to install many cladding panels, and thus many rails and connectors to support them. Therefore, the measurement and careful installation of these rails and panels can be time-consuming and costly.

The present invention seeks to improve upon existing rail systems and connectors, and thereby reduce the complexity the installation process.

SUMMARY OF THE INVENTION

In accordance with a first aspect of the invention, there is provided a connector for connecting a lateral rail to a longitudinal rail, as defined in claim 1.

The connector may comprise a first portion configured to attach to the lateral rail; and a second portion configured to attach to the longitudinal rail. The second portion may extend perpendicularly from the first portion to form an L-shape with the first portion. The second portion may comprise a first retaining lip for engagement with a first corresponding feature of the longitudinal rail. The connector may be rotatable between an unlocked orientation, in which the first portion may be freely inserted and removed from the lateral rail, and a locked orientation, in which the first portion is secured to the lateral rail.

The first portion and the second portion may be substantially planar. The first portion and the second portion may be substantially rectangular. The first portion and the second portion may both extend from a joining edge. The first portion and the second portion may comprise a first distal edge and a second distal edge, respectively, which are distal to and parallel with the joining edge. The first portion and the second portion may comprise a first forward edge, a first rear edge, a second forward edge, and a second rear edge, respectively, which extend between the distal edges and the joining edge.

The first portion may comprise two parts separated by a cut-out. The cut-out may be substantially rectangular. The cut-out may extend between the first distal edge and the joining edge, parallel to the first front edge. The cut-out may be located substantially central relative to the joining edge.

The first corresponding feature may comprise a recess in the longitudinal rail. The first corresponding feature may comprise a first side of a recess in the longitudinal rail.

In some embodiments, the connector may be slidable along the lateral rail in the locked orientation.

The connector may be slidable in a lateral direction. The lateral direction may be a horizontal direction, for example, if the lateral rail is secured to a wall, floor, roof, or ceiling.

In some embodiments, the connector may be slidable along the longitudinal rail.

The connector may be slidable in a longitudinal direction. The longitudinal direction may be a vertical direction, for example, if the longitudinal rail is secured to a wall. Alternatively, the longitudinal direction may be a horizontal direction, for example, if the longitudinal rail is secured to a floor or ceiling.

In some embodiments, the first portion may comprise a curved edge.

The curved edge may extend along the first rear edge. The curved edge may extend along the whole or part of the first rear edge, along the whole or part of the first distal edge, and/or along the whole or part of the first front edge. The curved edge may extend along the first rear edge, the distal edge, and the first front edge. In such a connector, the first portion may have a substantially semi-circular shape.

The dimensions of the curved edge may be such that the distance from the curved edge the diagonally opposite corner of the first portion never exceeds the distance between inner surfaces of the lateral rail.

In some embodiments, the second portion may comprise a first tongue. The first retaining lip may be located at an edge of the first tongue that is distal from the first portion.

The first tongue may extend from the second distal edge towards, but not completely to, the joining edge. The first tongue may extend substantially in the second plane. The first tongue may be slightly angled from the second plane, towards the first plane. The first tongue may be located substantially central relative to the joining edge. The first retaining lip may protrude in the direction of the first portion.

In some embodiments, the first tongue may be resiliently biased in the direction of the first retaining lip.

The first tongue may be resiliently biased towards the first portion.

In some embodiments, the second portion may comprise a second tongue. The second portion may have a second retaining lip on an opposite side of the second portion to the first retaining lip. The second retaining lip may be for engagement with a second corresponding feature of the longitudinal rail.

The second corresponding feature may comprise a recess in the longitudinal rail. The second corresponding feature may comprise a second side of a recess in the longitudinal rail.

In some embodiments, the second portion may comprise a third tongue. The third tongue may have a third retaining lip on an opposite side of the second portion to the first retaining lip. The second tongue and the third tongue may be located on either side of the first tongue.

The second tongue and/or the third tongue may extend from the second distal edge towards, but not completely to, the joining edge. The second tongue and/or the third tongue may extend substantially in the second plane. The second and third tongues may be located either side of the first tongue. The first tongue may be slightly angled from the second plane.

In some embodiments, the second retaining lip may be located at an edge of the second tongue that is distal from the first portion.

In some embodiments, the second tongue may be resiliently biased in the direction of the second retaining lip.

In some embodiments, the third retaining lip may be located at an edge of the third tongue that is distal from the first portion.

In some embodiments, the third tongue may be resiliently biased in the direction of the third retaining lip.

In some embodiments, the second retaining lip may extend in a direction opposite to the direction of the first retaining lip. The third retaining lip may extend in a direction opposite to the direction of the first retaining lip.

In some embodiments, the second portion may comprise one or more slots configured to receive one or more flanges of the lateral rail when the connector is in the locked orientation.

The one or more slots may extend inwards from the second front and rear edges. The slots may extend towards the first tongue. The slots may be symmetrical about the first tongue. The slots may be at a distance from the joining edge so as to align with the one or more flanges. The second portion may comprise two or more slots.

In some embodiments, the connector may comprise a tab extending parallel to the first portion to form a T-shape with the first portion and the second portion.

The tab may be congruent with the cut-out. Alternatively and preferably, the tab may be smaller than the cut-out. If the tab is smaller than the cut-out then, during subtractive manufacturing, the tab may be cut from the first portion using a single cut. This provides a simpler manufacturing process, requiring fewer cuts to form the connector.

In some embodiments, the connector may be formed of fire-resistant material, including metal.

The connector may be formed of steel.

In accordance with a second aspect of the invention, there is provided a rail system, as defined in claim 16.

The rail system may comprise a lateral rail configured to be secured to a wall. The rail system may comprise a connector as described herein. The rail system may comprise a longitudinal rail configured to be connected to the lateral rail by means of the connector.

In some embodiments, the lateral rail may comprise a substantially C-shaped cross-section, with an open face and a closed face.

The closed face may be provided by a rear surface.

In some embodiments, the lateral rail may comprise one or more flanges. The flanges may extend laterally along the lateral rail and may protrude at least partially across the open face.

The one or more flanges may protrude in a direction parallel to the rear surface that provides the closed face. The closed face may comprise a securing means for securing the lateral rail to a surface, for example, a wall. The securing means may comprise screw holes, hooks, fasteners, or other securing means known in the art.

In some embodiments, the connector may be insertable into the interior of the cross-section when in the unlocked orientation.

The dimensions of the first portion (in particular, the distance between the joining edge and the first distal edge) may be such that the first portion fits between the flanges of the lateral rail when in the unlocked orientation In some embodiments, the corresponding feature of the longitudinal rail may comprise a longitudinal recess extending along the length of the longitudinal rail. The first retaining lip may be configured to engage with the longitudinal recess thereby securing the connector to the longitudinal rail. The second retaining lip may be configured to engage with the longitudinal recess thereby securing the connector to the longitudinal rail. The third retaining lip may be configured to engage with the longitudinal recess thereby securing the connector to the longitudinal rail.

The longitudinal rail may comprise a central protrusion. The central protrusion may comprise the recess. The recess may extend from the closed face towards the open face. The longitudinal rail may comprise a substantially W-shaped cross-section. The central protrusion may provide a panel-securing means.

The recess may comprise a chamber at the end of the recess that is distal to the closed face. The chamber may have a greater lateral width than the recess. The recess and the chamber may form an arrow-head shape.

In some embodiments, the lateral rail may be formed of fire-resistant material, including metal. The longitudinal rail may be formed of fire-resistant material, including metal.

The lateral rail and/or the longitudinal rail may be formed of steel.

In accordance with a third aspect of the invention, there is provided a panel-mounting system.

The panel-mounting system may comprise a rail system as described herein. The panel-mounting system may comprise a panel extending laterally. The panel may have a gripping member extending along a longitudinal length of the panel. The gripping member may be configured to secure the panel to the longitudinal rail.

In some embodiments, the panel-mounting system may comprise a support frame having at least one longitudinal frame member. The longitudinal frame member may have a lateral cross-section with a C-shaped portion having a front opening. The longitudinal frame member may comprise a recess on one internal side of the C-shaped portion and an abutment surface on an opposing side of the C-shaped portion.

The abutment surface may comprise a longitudinal rib.

The panel-mounting system may comprise a panel. The panel may have a gripping member attached to a rear surface of the panel and extending along a substantial portion of a longitudinal length of the panel. In lateral cross-section, the gripping member may have a base portion attached to the panel and may have a locking arm extending from the base portion. The locking arm may comprise a head portion, an abutment portion and an intermediate portion between the head portion and the abutment portion. The locking arm may be resiliently deflectable.

On inserting the gripping member into the front opening of the C-shaped portion of the longitudinal member, the gripping member may adopt a first position in which the head portion engages the recess and the abutment portion abuts the abutment surface. The gripping member may hold the panel to the support frame by spring action of the deflected locking arm between the abutment surface and the recess. The locking arm may be deflectable into a second position in which the head portion of the locking arm disengages the recess in the C-shaped portion of the longitudinal member so as to free the gripping member from the support frame.

The gripping member may comprise a channel for receiving a longitudinally-extending side of the panel to be secured. The channel may have a substantially rectangular cross-section.

The panel-mounting system may comprise a shelf. Ends of the longitudinal rails may rest of the shelf, thus preventing them from moving in the direction of the ends.

In accordance with a third aspect of the invention, there is provided a method of mounting panels to a surface.

The method may comprise attaching a lateral rail to the surface. The lateral rail may have a cross-sectional profile adapted to receive a connector as described herein. The method may comprise securing a connector as described herein to the lateral rail, such that the connector is slideable along the lateral rail. The method may comprise securing a longitudinal rail to the slideable connector. The longitudinal rail may have a lateral cross-section with a C-shaped portion having a front opening configured to receive a locking arm portion of a gripping member. The method may comprise attaching a gripping member to a panel. The gripping member may extend along a substantial portion of an edge of the panel. The gripping member may have a cross-section that includes a resiliently deflectable locking arm. The method may comprise securing the panel to the longitudinal rail by inserting the gripping member into the C-shaped portion of the longitudinal rail so that the locking arm engages in a recess in the C-shaped portion of the longitudinal rail.

In accordance with a fourth aspect of the invention, there is provided a computer program.

The computer program may computer executable instructions that, when executed by a processor, cause the processor to control an additive manufacturing apparatus to manufacture the connector as described herein.

In accordance with a fifth aspect of the invention, there is provided a method of manufacturing a device via additive manufacturing.

The method may comprise obtaining an electronic file representing a geometry of a product wherein the product is a connector as described herein. The method may comprise controlling an additive manufacturing apparatus to manufacture, over one or more additive manufacturing steps, the product according to the geometry specified in the electronic file.

BRIEF DESCRIPTION OF THE FIGURES

Exemplary embodiments of the invention will now be described with reference to the Figures, in which.

DETAILED DESCRIPTION

Figure 1:
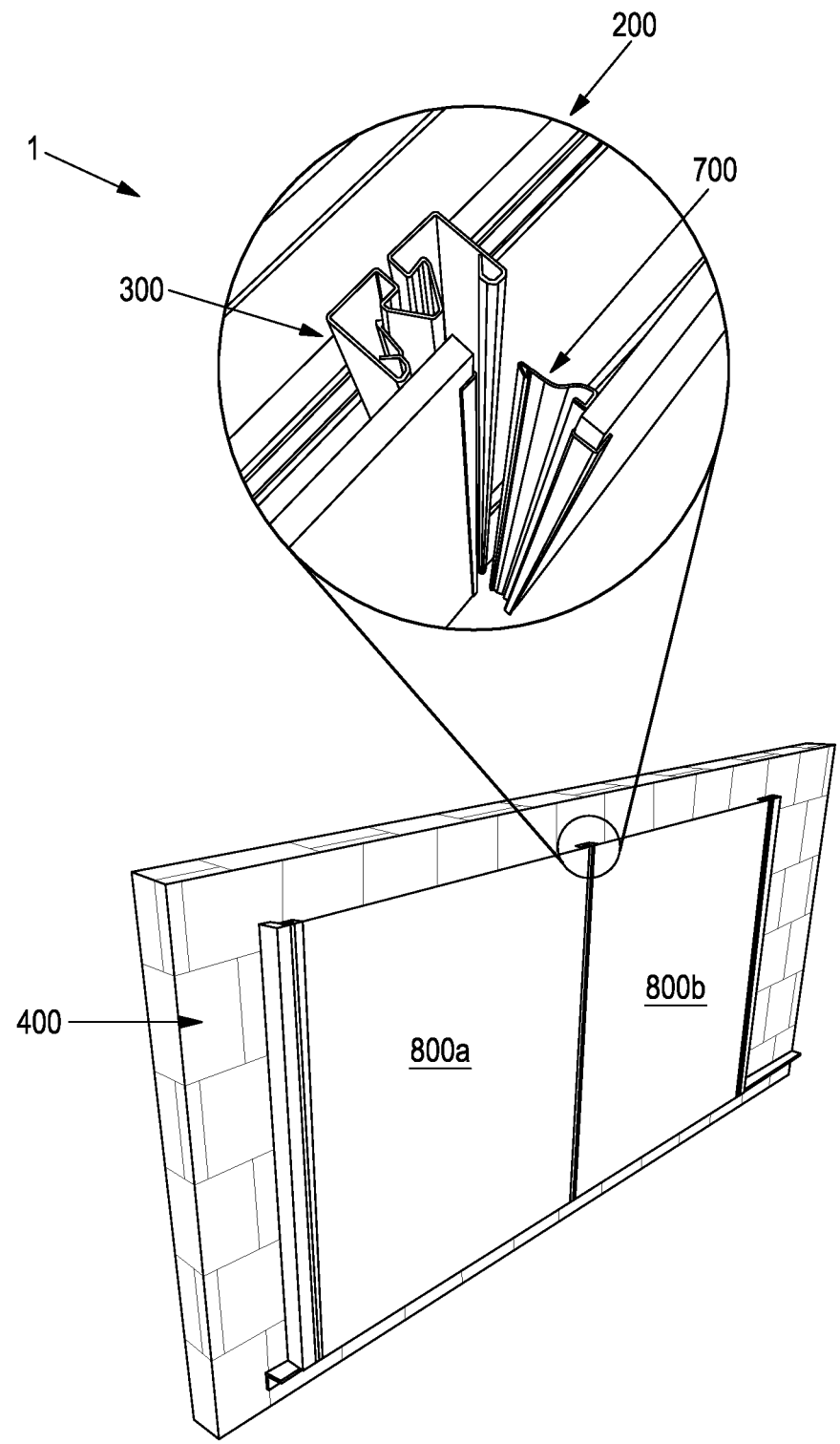
FIG. 1 shows a perspective and a magnified view of several panels secured to a rail system to form a panel mounting system.

FIG. 1 depicts a panel mounting system 1 for mounting a panel to a wall 400, floor, ceiling, roof, or other surface. The panel mounting system 1 comprises one or more connectors 100 (not shown), one or more lateral rails 200, and one or more longitudinal rails 300, which are connected to form a rail system, or framework 600 (see FIG. 6). The lateral rails 200 are connected to the longitudinal rails 300 by connectors 100.

The panel mounting system 1 further comprises one or more panels 800a, 800b secured to the longitudinal rails 300 of the rail system 600 by way of one or more gripping members 700. The panel mounting system 1 may further comprise a shelf 620 (see FIG. 6) for supporting the bottom ends of the longitudinal rails 300 (where these are vertical rails).

In the particular embodiment shown in FIG. 1, there is shown three longitudinal rails 300 and two panels 800a, 800b. However, it is understood that any number of longitudinal rails and panels (as well as lateral rails and connectors) may be used, depending on the required size and purpose of the panel mounting system.

Figure 2A:
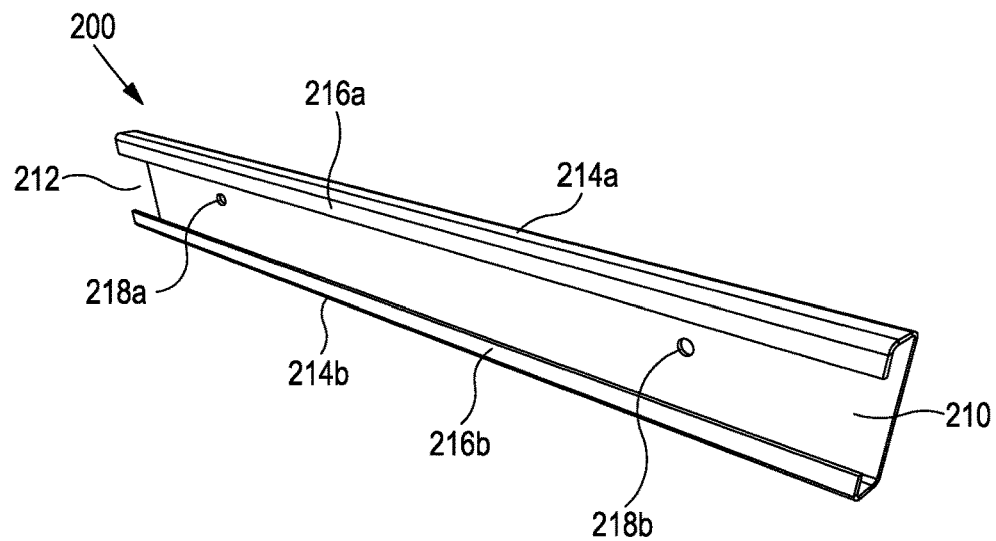
FIG. 2A shows a perspective view of a lateral rail.
Figure 2B:
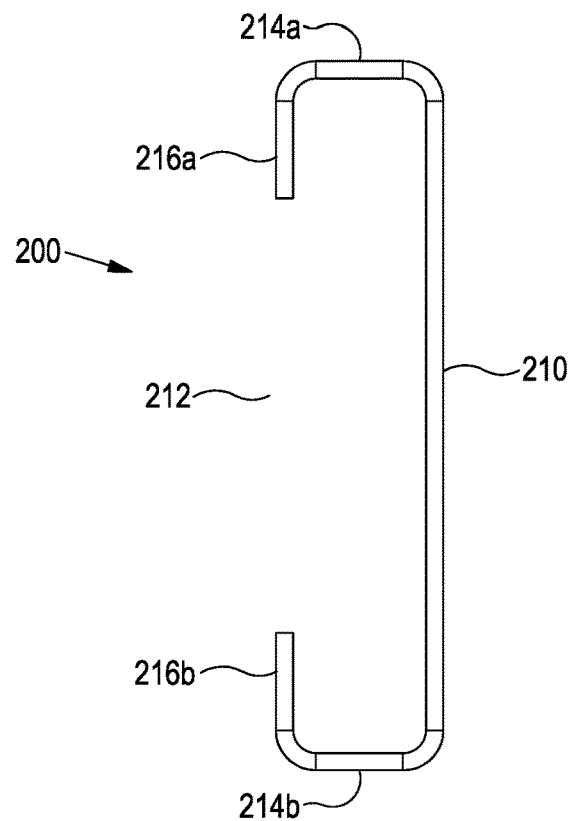
FIG. 2B shows a cross-sectional view of the lateral rail of FIG. 2A.

In order to form the panel mounting system 1, the lateral rails 200 are secured to the wall 400. FIGS. 2A and 2B depict a lateral rail 200 in greater detail. The lateral rail 200 extends substantially in a direction defined as the 'lateral' direction. Where the panels are mounted to a vertical wall, the lateral direction would typically be a horizontal direction. The lateral rail 200 comprises a closed face 210, an open face 212, an upper wall 214a, and a lower wall 214b, all of which extend laterally. It is understood that 'upper' and 'lower' are used with reference to the views of FIGS. 2A and 2B and do not otherwise denote a particular orientation.

The closed face 210 is provided by a rear surface of the lateral rail 200. The open face 212 is provided by the absence of a front surface of the lateral rail 200. The upper surface 214a and the lower surface 214b are substantially perpendicular to the closed face 210. As depicted in FIG. 2B, the lateral rail 200 comprises a substantially C-shaped cross-section.

The lateral rail 200 comprises flanges 216a, 216b. The flanges 216a, 216b extend laterally along the length of the lateral rail 200. The flanges 216a, 216b protrude at least partially across the open face 212. The flanges 216a, 216b protrude in a direction parallel to the rear surface that provides closed face 210. In other words, the flanges 216a, 216b protrude in a direction perpendicular to the upper wall 214a and the lower wall 214b.

The closed face 210 of the lateral rail 200 comprises securing means 218a, 218b for securing the lateral rail 200 to the wall 400. In FIG. 2A, the securing means 218a, 218b are depicted as holes that may be suitable, for example, for receiving screws. It is understood that other securing means may be used, for example, screws, nails, hooks, adhesive, or other standard securing means known in the art.

While the applications herein relate predominantly to the securing of the lateral rail 200 to a wall, it is understood that the lateral rail 200 may be secured to other surfaces such as floors, roofs, or ceilings. It is also understood that by 'walls' it is meant any surface that extends perpendicular to the floor. This could include doors, fences, support panels, and the like.

In order to connect a longitudinal rail 300 to the lateral rail 200, a connector 100 may first be connected to the lateral rail 200.

Figure 1A:
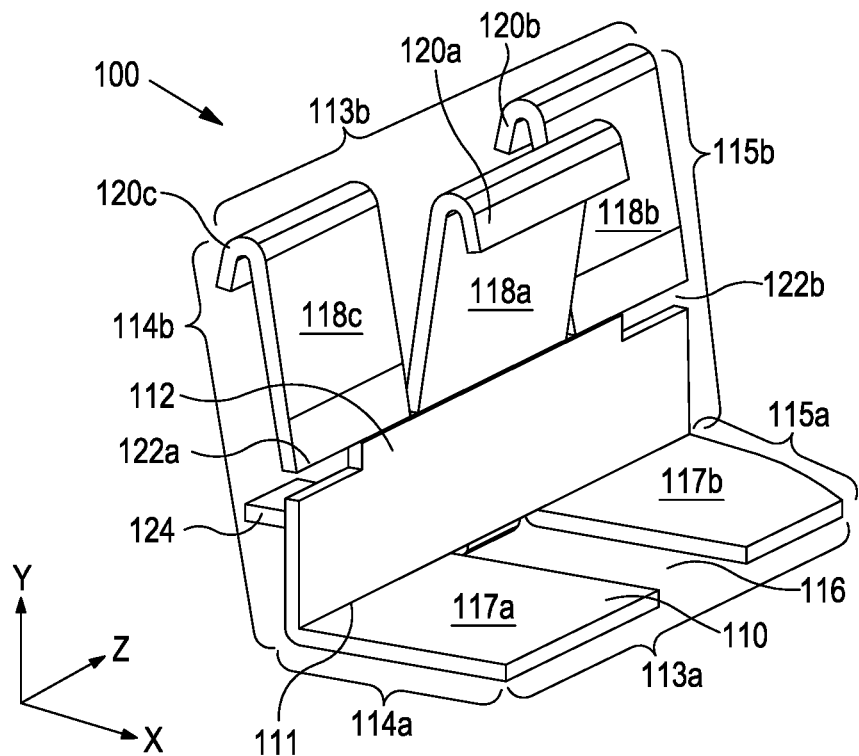
FIG. 1A shows a perspective view of a connector for connecting a lateral rail to a longitudinal rail.
Figure 1B:
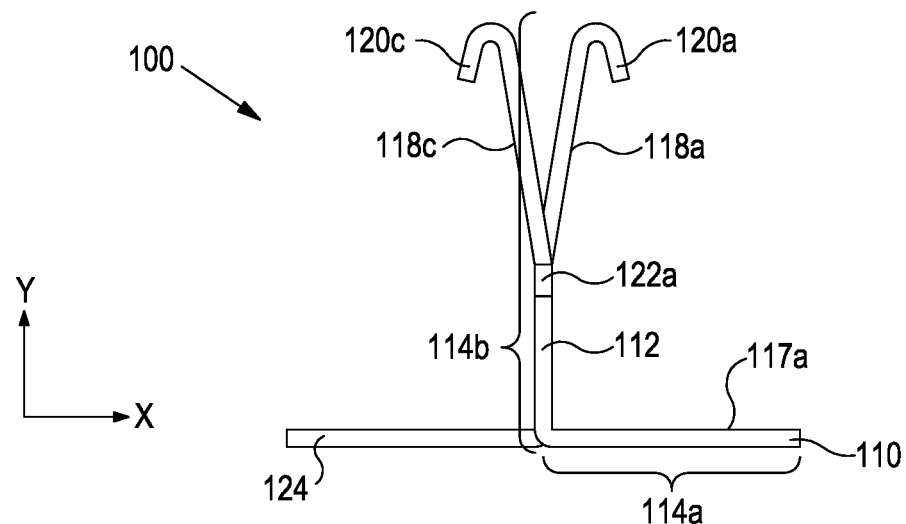
FIG. 1B shows a cross-sectional view of the connector of FIG. 1A.

FIGS. 1A and 1B depict a connector 100 for connecting a lateral rail to a longitudinal rail. The connector 100 comprises a first portion 110 and a second portion 112. The first portion 110 is substantially planar and defines a first plane. The second portion 112 is substantially planar and defines a second plane, which is perpendicular to the first plane. The first portion 110 and the second portion 112 both extend from a joining edge 111. The first portion 110 and the second portion 112 thereby form an L-shape in a third plane, perpendicular to the first and second planes.

In FIG. 1A, the first plane corresponds to the X-Z plane, the second plane corresponds to the Y-Z plane, and the third plane corresponds to the X-Y plane. The joining edge 111 extends in the Z-direction.

The first portion 110 is substantially rectangular and comprises a first distal edge 113a, distal to and parallel with joining edge 111. The second portion 112 is substantially rectangular and comprises a second distal edge 113b, distal to and parallel with joining edge 111. The first portion 110 comprises a first forward edge 114a and a first rear edge 115a that extend between the first distal edge 113a and the joining edge 111. The second portion 112 comprises a second forward edge 114b and second rear edge 115b that extend between the second distal edge 113b and the joining edge 111. It is understood that 'forward' and 'rear' are used with reference to the views of FIGS. 1A and 1B and they do not otherwise denote a particular orientation. The actual orientation will depend on what surface the panels are being mounted to—i.e. vertical wall, or horizontal surface, such as a ceiling, or any other orientation between horizontal and vertical.

The first portion 110 comprises a curved edge. In the embodiment shown in FIG. 1A, first rear edge 115a is the curved edge with the curve extending along the whole of the first rear edge 115a, such that the first rear edge 115a constitutes the curved edge. The dimensions of the curved edge are such that the distance from the curved edge to the diagonally opposite corner of the first portion 110 (i.e. the corner where edges 111 and 114a meet in FIG. 1A) never exceeds the distance between inner surfaces of the top and bottom walls 214a, 214b of the lateral rail 200 described above. This allows the first portion of the connector to be rotated within the C-shaped section of the rail as part of the installation procedure, as will be described in more detail below.

The first portion 110 has two parts 117a and 117b separated by a cut-out 116. The cut-out 116 is substantially rectangular. The cut-out 116 extends between the first distal edge 113a and the joining edge 111, parallel to the first front edge 114a. The cut-out 116 is located substantially central relative to the joining edge 111.

The second portion 112 comprises a first tongue 118a extending from the second distal edge 113b towards, but not completely to, the joining edge 111. The first tongue 118a extends substantially in the second plane. However, the first tongue 118a may be slightly angled from the second plane, towards the first plane as shown in FIG. 1A, and seen more clearly in FIG. 1B. The first tongue 118a is located substantially central relative to the joining edge 111.

The first tongue 118a comprises a first retaining lip 120a for engaging with a corresponding feature of a longitudinal rail (as will be described further below). The first retaining lip 120a is located at a distal edge of the first tongue 118a that is parallel with the second distal edge 113b. The first retaining lip 120a protrudes in the direction of the first portion 110. The first tongue 118a is resiliently biased in the direction in which the first retaining lip 120a protrudes. In other words, the first tongue 118a is resiliently biased towards the first portion 110.

The second portion 112 further comprises a second tongue 118b and a third tongue 118c extending from the second distal edge 113b towards, but not completely to, the joining edge 111. The second and third tongues 118b, 118c also extend substantially in the second plane. The second and third tongues 118b, 118c are located either side of the first tongue 118a.

Similarly to the first tongue 118a, the second tongue 118b comprises a second retaining lip 120b and the third tongue comprises a third retaining lip 120c. The second retaining lip 120b and the third retaining lip 120c both protrude in a direction opposite to the first retaining lip 120a. In other words, the second retaining lip 120b and the third retaining lip 120c protrude in the direction of tab 124 (see below).

The second tongue 118b and the third tongue 118c are resiliently biased in the direction in which the second retaining lip 120b and the third retaining lip 120c protrude. In other words, the second tongue 118b and the third tongue 118c are resiliently biased towards the tab 124.

While the embodiment shown in the Figures depicts the connector 100 as comprising three tongues 118a-c each comprising a retaining lip 120a-120c, it will be understood that the connector 100 may comprise only the first tongue 118a and the first retaining lip 120a. Alternatively, the connector 100 may comprise only the second tongue 118b, the third tongue 118c, the second retaining lip 120b, and the third retaining lip 120c. As described in more detail below, the working principle of the connector 100 is unchanged by such variations.

Advantageously, however, the connector 100 comprises all three tongues 118a-c and retaining lips 120a-c. Such embodiments may have a stronger and more stable connection between the connector 100 and the longitudinal rail 300 (as described below).

It is contemplated that, in some embodiments, the first retaining lip 120a may be located directly on the second distal edge 113b. In such an example, the second portion 112 may not comprise a first tongue 118a. In such an example, the second portion 112 may be resiliently biased towards the first portion 110.

The second portion 112 comprises two slots 122a, 122b. The slots 122a, 122b extend inwards from the second front and rear edges 114b, 115b. The slots 122a, 122b extend towards the first tongue 118a and are symmetrical about the first tongue 118a. The slots 122a, 122b are at a distance from the joining edge 111 so as to align with the flanges 216a, 216b of the lateral rail 200 when the connector is inserted into the rail, as will be described further below.

The connector 100 further comprises a tab 124. The tab 124 extends from joining edge 111, parallel to the first plane, and in an opposite direction to first portion 110. The tab 124 thereby forms a T-shape with the first portion 110 and the second portion 112.

Advantageously, the tab 124 provides additional stability in the lateral direction. The tab 124 may brace against the lateral rail 200 in order to provide additional stability. In particular, the tab 124 provides stability to the longitudinal rail 300 when it is secured to the connector 100 and when rotational forces are exerted on the longitudinal rail 300 about the longitudinal axis. That is, the tab 124 (and the first portion 110) provide resistance against torsion of the longitudinal rail in both directions. In the absence of the tab 124, resistance against torsion may only be provided in a single direction (e.g. when the longitudinal rail 300 is rotated towards the first portion 110.

Advantageously, the tab 124 and the cut-out 116 allow for ease of manufacturing when using subtractive manufacturing. For example, the tab 124 and the cut-out 116 allow for ease of manufacturing during a laser cutting process, or similar. The tab 124 may be formed by performing a laser cut from first portion 110 and "folding" the tab 124 away from the first portion 110, thereby forming the cut-out 116 and the T-shape profile as described herein.

FIG. 1B shows a cross-sectional view of the connector 100. From this view, the T-shape defined by first portion 110, second portion 112, and tab 124 can be more clearly seen.

The process and features associated with securing a connector to a lateral rail will now be described with reference to FIGS. 4A-4C.

Figure 4A:
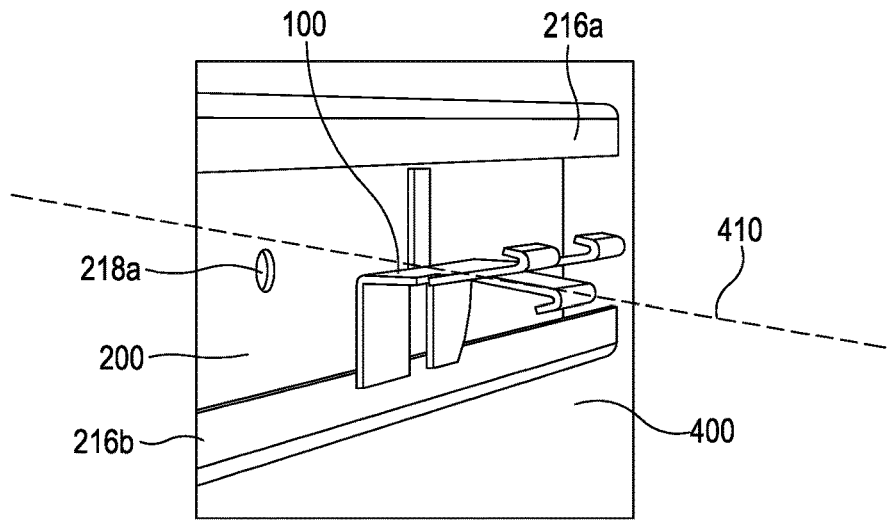
FIGS. 4A to 4C show an exemplary sequence of steps for connecting a connector to a lateral rail.
Figure 4B:
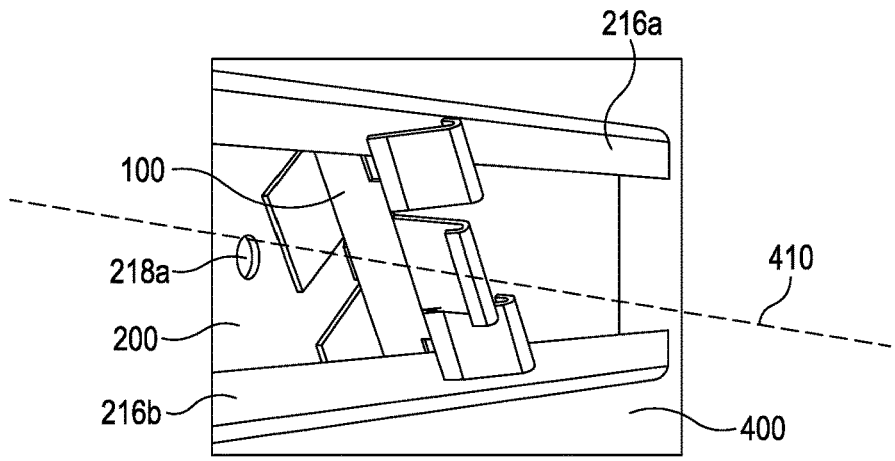
Figure 4C:
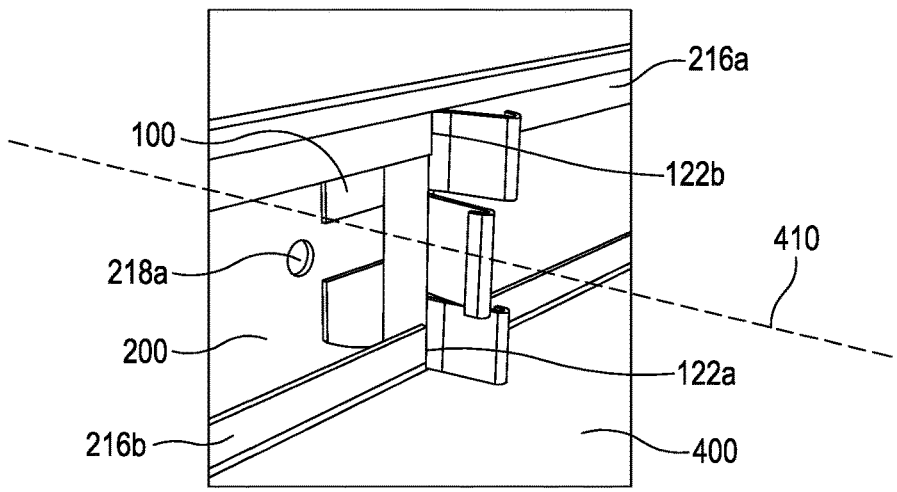

FIGS. 4A-4C depict a connector 100 and a lateral rail 200. The lateral rail 200 is secured to a wall 400 by securing means 218a, 218b—for example screws (not shown) through provided screw holes. The securing means 218a, 218b are depicted as a screw arrangement but other securing means may be used. For ease of explanation, FIGS. 4A-4C also depicts a rotation axis 410, which extends in a direction orthogonal to the wall 400 and to the lateral rail 200. The rotation axis 410 passes through the centre of the connector 100. That is, the rotation axis 410 of the connector 100 bisects joining edge 111.

FIGS. 4A-4C illustrate the process of inserting the connector 100 into the lateral rail 200 and rotating the connector 100 from an unlocked orientation into a locked orientation, thereby securing the connector 100 to the lateral rail 200. Each FIG. 4A-4C indicates a clockwise rotation of the connector 100 relative to the lateral rail 200 of approximately 45° from the preceding Figure. The steps of this process are described in detail below.

As shown in FIG. 4A, the connector 100 is firstly inserted into the lateral rail 200. That is, the first portion 111 of the connector 100 is inserted into the interior of the C-shaped cross-section of the lateral rail 200 between the flanges 216a, 216b, and with the joining edge 111 essentially parallel to the rail.

The connector 100 is inserted in an unlocked orientation relative to the rotation axis 410. In the unlocked orientation, the connector 100 is oriented such that the second portion 112, joining edge 111, and first retaining lip 120a are all parallel with the lateral rail 200. In this Figure, the cut-out 116 is depicted as pointing downwards (relative to the Figure), and the tab 124 is pointing upwards. However, it is apparent that the connector 100 can also be considered to be in the unlocked orientation if the connector 100 was rotated by 180° about the rotation axis 410.

During insertion of the connector 100 into the lateral rail 200, the tab 124 may be initially angled so that it is inserted underneath the flange 216a. The connector 100 can then be moved towards the upper surface 214a of the lateral rail 200, thus allowing the first portion 110 to be inserted into the open face 212 of the lateral rail 200. In other words, while the combined length of the tab 124 and the first portion 110 may be greater than the distance between the flanges 216a and 216b, the connector 100 can still be inserted into the lateral rail 200 by firstly inserting the tab 124, followed by the first portion 110 (or vice versa). Alternatively, in some embodiments, the combined length of the tab 124 and the first portion 110 may be less than the distance between the flanges 216a and 216b.

The dimensions of the first portion 110 (in particular, the distance between the joining edge 111 and the first distal edge 113a) are such that the first portion 110 fits between the flanges 216a, 216b of the lateral rail 200. The connector 100 is thereby insertable into the lateral rail 200 via the open face 212 of the lateral rail. In FIG. 4A, the connector 100 has been inserted into the lateral rail 200 with the first portion 110 of the connector 100 abutting the rear surface of the lateral rail 200. In this position, the second portion 112 protrudes orthogonal to the wall 400, parallel to the rotation axis 410

In this way, while in the unlocked orientation, the connector 100 may be freely inserted and removed from the lateral rail 200. This is achieved by moving the connector 100 in the direction of the rotation axis 410, i.e. towards or away from the wall 400.

Next, as shown in FIG. 4B, the connector 100 may be rotated about the rotation axis 410 out of the unlocked orientation and towards the locked orientation. In the example shown, the connector 100 is rotated clockwise. FIG. 4B indicates an intermediate orientation, after the connector 100 has been rotated clockwise by approximately 45° from the unlocked orientation, but prior to the connector 100 being rotated fully into the locked orientation.

FIG. 4B illustrates an advantage provided by curved edge 115a. During the rotation from the unlocked orientation to the intermediate orientation, the curved edge 115a and, in particular, the corner distal from joining edge 111, must pass bottom wall 214b. The curved edge 115a prevents the bottom wall 214b from obstructing rotational movement, and thus the curved edge 115a that can move freely past bottom wall 214b.

The presence of only a single curved edge 115a, as depicted in the figures, may only allow rotation of the connector 100 in a single direction (e.g. clockwise). Alternatively, the presence of a single curved edge 115a may be sufficient to enable rotation in either direction (i.e. clockwise or counter-clockwise). Whilst it would appear that an opposing edge to curved edge 115a (e.g. the first forward edge 114a, as described above) would abut the upper surface 214a, the curved edge 115a may allow the connector 100 to move sufficiently close to lower surface 214b such that the opposing edge does not contact upper surface 214a.

Advantageously, the presence of only a single curved edge 115a increases the simplicity of the connector 100, thereby improving the ease of manufacture. Advantageously, the presence of only a single curved edge 115a results in a larger surface area of the first portion 110. Advantageously, a larger surface area of the first portion 110 provides a larger interaction area between the connector 100 and the lateral rail 200, thereby improving retention of the connector 100.

In alternative embodiments of the present invention, the curved edge 115a may be present on multiple edges. This may provide additional rotational freedom of connector 100.

Turning to FIG. 4C, the connector 100 is fully rotated into the locked orientation. The connector 100 is rotated clockwise by 45° with respect to FIG. 4B, and 90° with respect to FIG. 4A. In the locked orientation, the second portion 112, the joining edge 111, and the first retaining lip 120a are all perpendicular to the lateral direction. That is, they extend parallel to a longitudinal direction. The cut-out 116 and the tab 124 extend in the lateral direction.

In this Figure, a function of the slots 122a, 122b can be seen. In the locked orientation, the dimensions of the second portion 112 (and, in particular, the distance between the second forward edge 114b and the second rear edge 115b) are such that the second portion 112 is too large in the longitudinal direction to fit between the flanges 216a, 216b. However, the presence of the slots 122a, 122b mean that the flanges 216a, 216b of the lateral rail 200 can pass through the slots 122a, 122b. That is, the slots 122a, 122b allow the connector 100 to be rotated past the flanges 216a, 216b, and into the locked orientation. Advantageously, the slots 122a, 122b and the flanges 216a, 216b help to retain the connector 100 in the lateral rail 200. Advantageously, the slots 122a, 122b and the flanges 216a, 216b provide additional stability to the connector 100, in particular, in relation to the lateral rail 200.

FIG. 4C illustrates the 'locked' nature of the locked orientation. Due to the engagement between the flanges 216a, 216b and the slots 122a, 122b, the connector 100 cannot be freely removed from the lateral rail 200 by moving the connector 100 in the direction of the rotation axis 410, i.e. away from the wall 400. If the connector 100 were to be urged away from the wall 400, each of the flanges 216a, 216b will engage with an inner surface of the slots 122a, 122b thereby preventing further movement.

Furthermore, the engagement between the flanges 216a, 216b and the slots 122a, 122b prevents movement of the connector 100 in the longitudinal direction. This may be useful, for example, if something is secured to the connector that provides a force (e.g. weight) in the longitudinal direction. In such a situation, it is advantageous for the connector not to move in the longitudinal direction.

It will be noted, however, that the connector 100 is free to move, or 'slide', in the lateral direction, along the lateral rail 200. Advantageously, this allows a potential installer to secure the connector 100 to the lateral rail 200 with little attention required to the necessary lateral location of the installation.

This may be useful, for example, if installing a panel or longitudinal rail onto a wall. Using a connector according to the present invention, the installer does not need to know the exact dimensions of the panel, longitudinal rail, and/or of the wall prior to installation. Instead, the connectors 100 can be secured to the lateral rail 200 at any lateral location and then can be slid along the lateral rail 200 to the correct location. This may be performed when only the connector 100 is secured to the lateral rail 200, or indeed, even after the longitudinal rail or the panel has been secured to the connector 100.

In order to detach the connector 100 from the lateral rail 200, the reverse of the aforementioned steps is performed. In this example, this involves rotating the connector 100 clockwise about the rotation axis 410 until the unlocked orientation is reached, and the connector 100 may then be moved away from the wall 400 along the rotation axis 410.

Figure 3A:
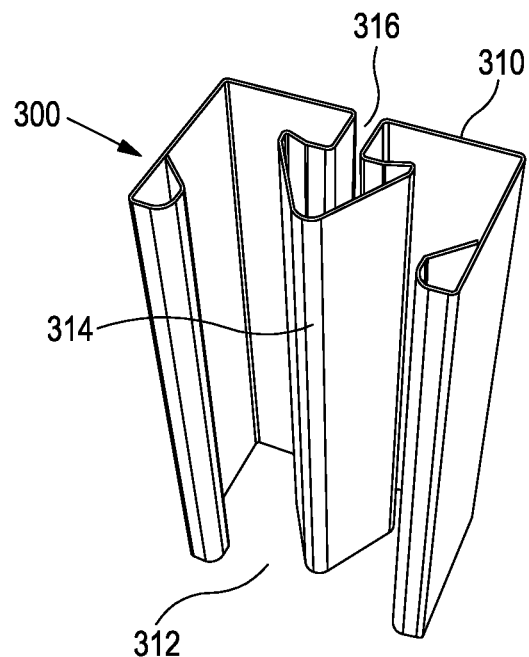
FIG. 3A shows a perspective view of a longitudinal rail.
Figure 3B:
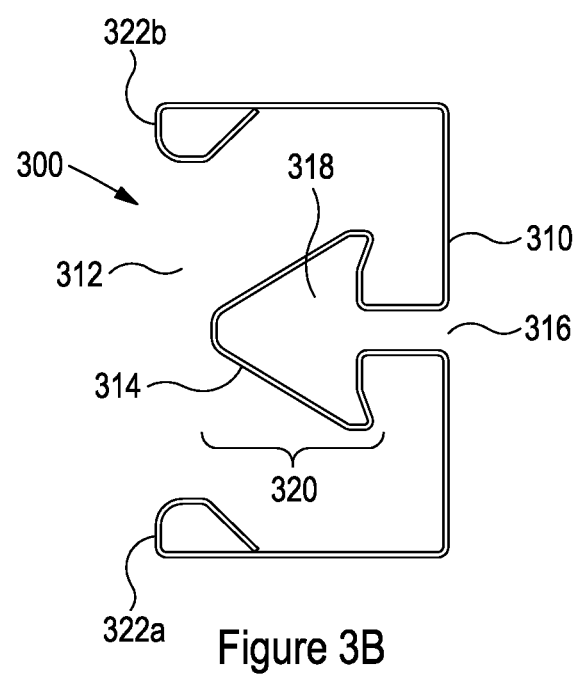
FIG. 3B shows a cross-sectional view of the longitudinal rail of FIG. 3A.

In order to form a rail system 600, it is necessary to connect the connector 100 to a longitudinal rail 300. FIGS. 3A and 3B depict a longitudinal rail 300 in greater detail. The longitudinal rail 300 extends substantially in a direction defined as the 'longitudinal' direction. The longitudinal rail 300 comprises a substantially closed face 310 and an open face 312.

The longitudinal rail 300 comprises a central protrusion 314. The central protrusion 314 comprises a recess 316 extending longitudinally along the length of the rail 300. The recess 316 extends from the closed face 310 towards the open face 312. As depicted in FIG. 3B, the longitudinal rail 300 comprises a substantially W-shaped cross-section, formed by the closed face 310, the open face 312, the central protrusion 314, and the recess 316.

The recess 316 is configured to engage with the first retaining lip 120a of the connector 100. The recess 316 thereby constitutes a corresponding feature of the longitudinal rail 300. The recess 316 comprises a chamber 318 at the end of the recess 316 that is distal to the closed face 310. The chamber 318 is open to the recess 316.

FIG. 3B depicts the chamber 318 as having a lateral width greater than that of recess 316. The recess 316 and the chamber 318 thereby form an arrowhead-shape. The arrowhead-shape allows the first retaining lip 120a to engage with the recess 316, securing the connector 100 to the longitudinal rail 300. The arrowhead-shape in particular provides a longitudinal symmetry to the longitudinal rail 300, allowing the rail 300 to be secured to the connector 100 regardless of which way round the rail is.

Additionally, the connector 100 may be installed with the first retaining lip 120a facing in either direction, and the longitudinal rail 300 may still be installed. This advantage is more apparent with reference to FIGS. 5A-5C below.

However, it will be appreciated that the recess 316 and the chamber 318 may form other shapes. For example, the recess 316 and the chamber 318 may form a T-shape. Alternatively, the recess 316 and the chamber 318 may form an L-shape (i.e. having only one of the two branches of the T-shape). In such an example, the longitudinal rail 300 would have to be installed in a particular orientation, but the securing of the connector 100 to the rail 300 would be otherwise unaffected.

On a side opposing the recess 316, central protrusion 314 comprises panel-securing means 320. In FIG. 3B, the panel-securing means 320 is depicted as an arrowhead shape formed by the central protrusion 314. The longitudinal rail 300 also comprises longitudinal ribs 322a, 322b. The longitudinal ribs 322a, 322b protrude towards the central protrusion 314 from either side of the longitudinal rail 300.

It will be appreciated that the presence and the shape of the panel-securing means 320 and the longitudinal ribs 322a, 322b is independent of the recess 316, chamber 318, and how these connect to a connector. For this reason, it is possible that an alternative panel-securing means may be implemented, while maintaining the functionality of the connection between the longitudinal rail and a connector as described herein.

The panel-securing means 320 and the longitudinal ribs 322a, 322b are relevant to the securing of a panel to the longitudinal rail 300. This is explained in detail below.

The process and features associated with securing a connector to a longitudinal rail will now be described with reference to FIGS. 5A-5C.

Figure 5A:
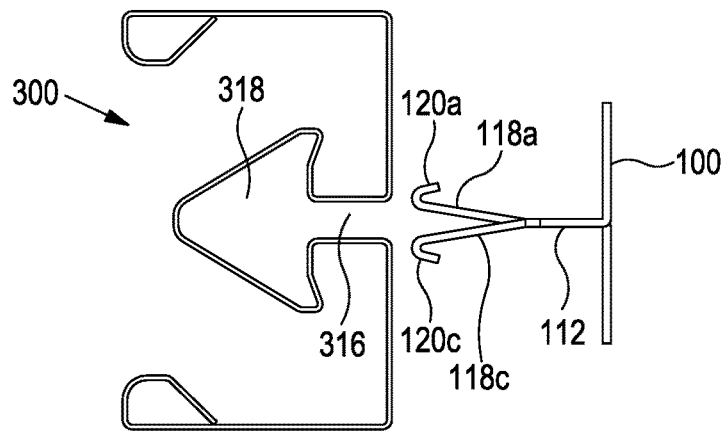
FIGS. 5A to 5C show an exemplary sequence of steps for connecting a connector to a longitudinal rail.
Figure 5B:
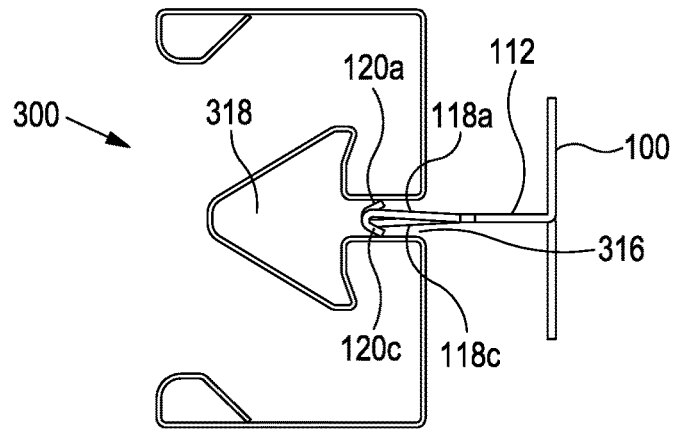
Figure 5C:
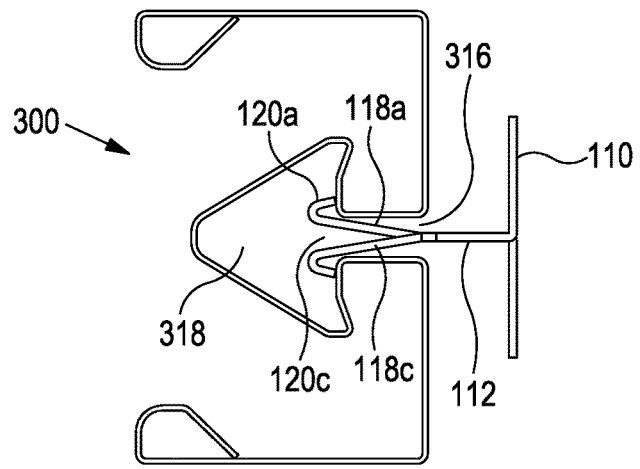

FIGS. 5A-5C depict a connector 100 and a longitudinal rail 300. The connector 100 may be already secured to a lateral rail 200, as described above. Alternatively, the connector 100 may be connected to a longitudinal rail 300 without having first been connected to a lateral rail 200. FIGS. 5A-5C illustrate the process of inserting the second portion 112 of the connector 100 into the longitudinal rail 300, thereby securing the connector 100 to the longitudinal rail 300.

FIG. 5A illustrates the connector 100 and the longitudinal rail 300 prior to connection. The second portion 112 and, in particular, the three retaining lips 120a-c are laterally aligned with the recess 316 in the rear of longitudinal rail 300.

FIG. 5B illustrates an initial position in which the second portion 112 has been partially inserted into the recess 316. Inner walls of the recess 316 abut the three retaining lips 120a-c, urging the first tongue 118a away from the direction of the first portion 110 and towards the direction of the tab 124, and urging the second tongue 118b and the third tongue 118c in the opposite direction. In other words, the inner walls of the recess 316 squeeze the first tongue 118b towards the second tongue 118b and the third tongue 118c.

FIG. 5C illustrates a secured position in which the second portion 112 is fully inserted into the recess 316. In the secured position, the second portion 112 and the three tongues 118a-c extend into the chamber 318. The three retaining lips 120a-c are therefore inside the chamber 318. As described above, the first tongue 118a is resiliently biased in the direction of the first portion 110 and the second tongue 118b and the third tongue 118c are resiliently biased in the direction of the tab 124. Therefore, once the three retaining lips 120a-c are no longer abutting the inner walls of the recess 316, the resilient bias of the three tongues 118a-c urges the retaining lips 120a-c past the inner walls and into engagement with edges of the chamber 318.

Once the retaining lips 120a-c are engaged with the chamber 318, the connector 100 cannot be removed from the longitudinal rail 300 by simply pulling the connector 100 away from the longitudinal rail 300. The retaining lips 120a-c abut the edge of the chamber 318, thereby preventing further movement of the longitudinal rail 300 or the connector 100, relative to one another.

It will be noted, however, similarly to the securing between the connector 100 and the lateral rail 200, that the connector 100 is free to move, or 'slide', in the longitudinal direction, along the longitudinal rail 300. Advantageously, this allows a potential installer to secure the connector 100 to the longitudinal rail 300 with little attention required to the necessary longitudinal location of the installation.

This may be useful, for example, if installing the longitudinal rail onto a lateral rail or a wall. Using a connector according to the present invention, the installer does not need to know the exact dimensions of the lateral rail and/or of the wall prior to installation. Instead, the connectors 100 can be secured to the longitudinal rail 300 at any longitudinal location and then can be slid along the longitudinal rail 300 to the correct location. This may be performed when only the connector 100 is secured to the longitudinal rail 300, or indeed, even after the connector 100 has been secured to the lateral rail or the wall.

When combined with the corresponding sliding functionality associated with the lateral rail 300, this allows for a system of rails that can be slidably configured after installation. That is, a plurality of longitudinal rails and lateral rails affixed together as described herein can be adjusted by sliding the longitudinal rails in the lateral and/or the longitudinal direction), in order to adjust horizontal and vertical positioning, respectively.

Figure 6:
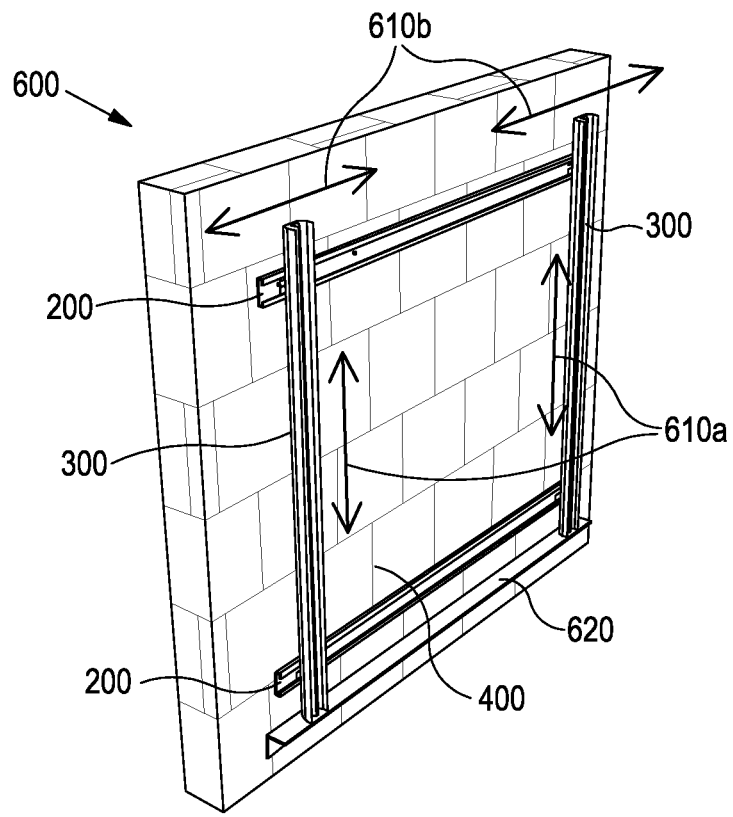
FIG. 6 shows a perspective view of a rail system.

Such a system 600, is shown in FIG. 6. Arrows 610a indicate the adjustable longitudinal positioning of the longitudinal rails 300, relative to the lateral rails 200. Arrows 610b indicate the adjustable lateral positioning of the longitudinal rails 300, relative to the lateral rails 200. Of course, if the longitudinal rails 300 were secured to the wall 400 instead of the lateral rails 200, then the adjustability would apply to the lateral rails 200.

Again, the examples described herein relate to the use of the rails and connectors with respect to a wall 400, and terms such as 'horizontal' and 'vertical' may be construed as such. However, it will be understood that this arrangement may instead be applied to a ceiling or floor, in which case the interpretation of such terms should be adjusted accordingly.

It may be desirable to prevent further longitudinal movement of the longitudinal rails 300 after installation is complete. If this is the case, a shelf 620 may be installed. The shelf 620 may be installed prior to or after the installation of the rail system 600. In FIG. 6, the lowermost ends of the longitudinal rails 300 rest on the shelf 620, thus preventing them from moving downwards. This may be advantageous, for example, if a panel or other heavy item is to be secured to the longitudinal rails 300, which may otherwise have caused the longitudinal rails 300 to move downwards. While not depicted, it is also possible to add other shelves to prevent upwards longitudinal movement, or lateral movement in either direction, if required.

Figure 7:
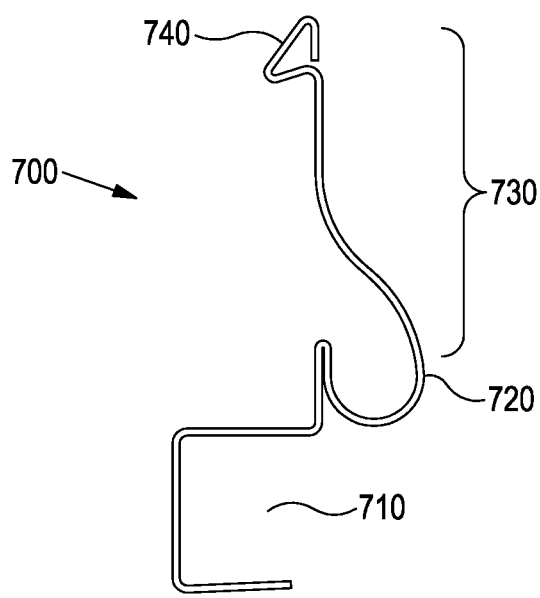
FIG. 7 shows a cross-sectional view of a gripping member for securing a panel to a longitudinal rail.

The panels 800a, 800b may be secured to the rail system 600 by securing to the longitudinal rails 300. This may be achieved using a gripping member 700. FIG. 7 depicts a lateral cross-section of a gripping member 700 for securing a planar panel to a longitudinal rail. The gripping member 700 extends in the longitudinal direction, which extends into the view of FIG. 7.

The gripping member 700 comprises in lateral cross-section, a base portion 710 that attaches to the panel and a locking arm portion 730 extending from the base portion 710. In the depicted embodiment, the base portion 710 includes a channel form for receiving a longitudinally-extending side of the panel to be secured. The channel of base portion 710 has a substantially rectangular cross-section, as shown in FIG. 7. This is understood to correspond to a panel that has a substantially rectangular edge cross-section. However, the cross-sectional shape of the channel 710 may be differently formed in order to match the cross-section shape of the panel edge. For example, the channel may have a semi-circular cross-section.

Extending from the base portion 710 is a resiliently deflectable locking arm 730. While described as an arm based on its appearance in FIG. 7, it is understood that this feature may extend longitudinally along substantially the whole of the gripping member 700. The locking arm 730 includes a head portion 740, an abutment portion 720 and an intermediate portion between the head portion and the abutment portion. The abutment portion 720 has a rounded cross-sectional shape. This shape may assist in providing the resilient deflectability of the locking arm 730.

The process and features associated with securing a panel to a longitudinal rail, via a gripping member, will now be described with reference to FIGS. 8A-8C.

Figure 8A:
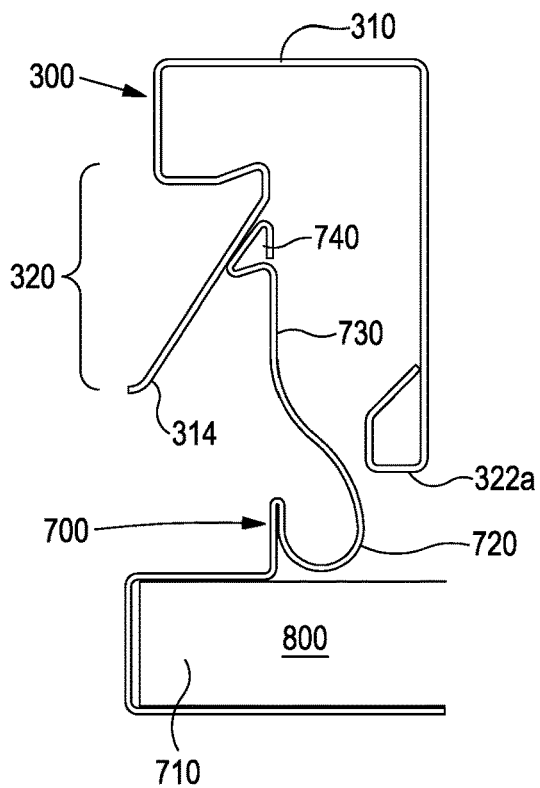
FIGS. 8A to 8C show an exemplary sequence of steps for securing a panel to a longitudinal rail.
Figure 8B:
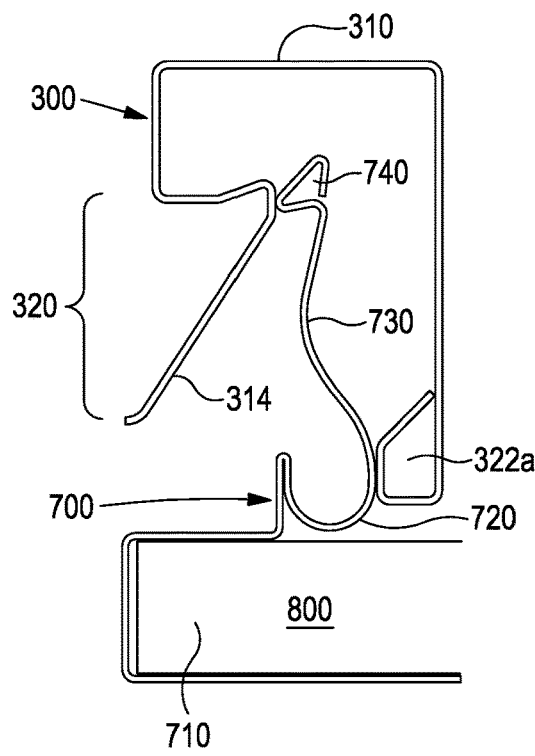
Figure 8C:
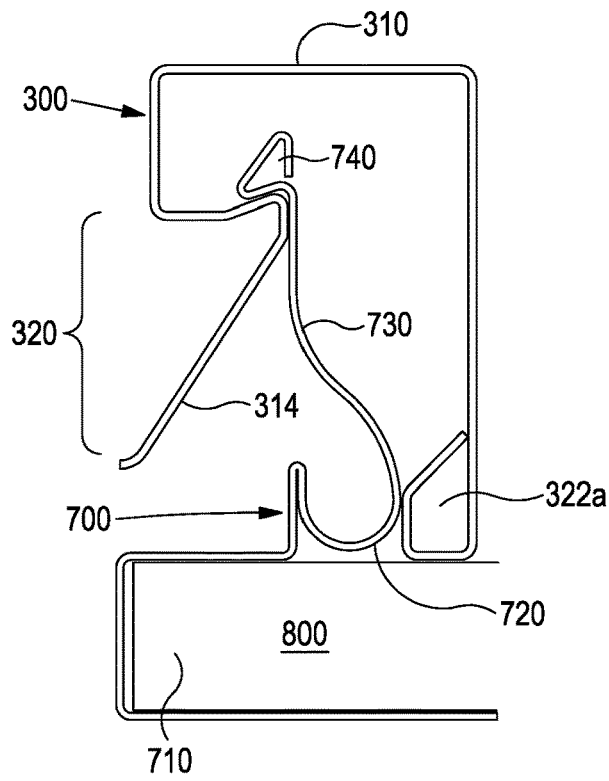

FIGS. 8A-8C depict a cross-section of a portion of a longitudinal rail 300, a gripping member 700, and a portion of a panel 800. In FIGS. 8A-8C, the channel of the base portion 710 of the gripping member 700 has received an edge of a panel 800. It may be possible, however, to secure the gripping member 700 to the longitudinal rail 300 prior to inserting the panel 800 into the channel of the base portion 710.

Similarly, the longitudinal rail 300 may already be connected a lateral rail 200 via a connector 100, as described above. Alternatively, the gripping member may be connected to a longitudinal rail 300 without first connecting the longitudinal rail to a connector 100 or a lateral rail 200. FIGS. 8A-8C illustrate the process of inserting the locking arm 730 into the longitudinal rail 300, thereby securing the gripping member 700 (and thus the panel 800) to the longitudinal rail 300.

FIG. 8A illustrates the gripping member 700 and the longitudinal rail 300 in an initial stage of connection. The gripping member 700 and, in particular, the locking arm 730 have been inserted into the open face 312 of the longitudinal rail 300. A face of the head portion 740 of the gripping member 700 is in contact with the arrowhead profile of central column 314 of the longitudinal rail 300. The arrowhead profile and the slanted face of the head portion 740 may be parallel in order to assist in guiding the gripping member 700 into the correct position with respect to the longitudinal rail 300.

FIG. 8B illustrates an intermediate stage in which the gripping member 700 has been pushed further into the longitudinal rail 300. The abutment portion 720 of the locking arm 730 abuts (i.e. makes contact with) the longitudinal rib 322a. Advantageously, the locking arm 730 has been urged away from its natural position, and in a direction away from the central protrusion 314, by virtue of the interaction between the head 740 and the arrowhead profile of central column 314. The locking arm 730 is at its substantially greatest deflection since the head 740 is in contact with the widest portion of the central protrusion 314. In addition, it noted that longitudinal rib 322a is in abutment with the hinge portion 720. This provides additional lateral guidance for the gripping member 700 as well as a fulcrum for the deflection of the locking arm 730.

FIG. 8C illustrates the final stage in which the gripping member 700 is fully inserted into the longitudinal rail 300, thereby securing the gripping member 700 (and thus the panel 800) to the longitudinal rail 300. In this position, the locking arm 730 extends fully into the longitudinal rail 300 such that the head 740 has passed the widest part of the central protrusion 314. The resilient nature of the locking arm 730 advantageously biases the head towards the central protrusion 314. In this way, the head portion 740 moves into a position such that it is secured behind the arrowhead profile of the central protrusion 314. The head portion 740 engages the longitudinal rail 300 in the recess behind the arrow-head profile of the longitudinal rail 300. The hooked profile of the head 740 abuts against the rear of the arrow-head profile, preventing the gripping member 700 from being removed from the longitudinal rail 300 simply by pulling in a direction perpendicular to the panel 800. Thus, by inserting the gripping member 700 into the c-shaped front opening the longitudinal rail 300, the gripping member 700 adopts a first position in which the head portion 740 engages the recess and the abutment portion 720 abuts an abutment surface (longitudinal rib 322a). The gripping member 700 holds the panel to the longitudinal rail 300 by spring action of the deflected locking arm 730 between the abutment surface and the recess.

As seen in FIGS. 8A-8C, the interaction between the gripping member 700 and the longitudinal rail 300 only requires half of the longitudinal rail 300 and half of the panel securing means 320, provided by the arrowhead profile of the central protrusion 314. This allows two panels 800a, 800b to be secured to a single longitudinal rail 300. FIG. 9 depicts such a configuration. Advantageously, this allows the gaps between panels to be substantially reduced, compared to, for example, a system that requires two longitudinal rails for each join between panels.

To remove one of the panels 800a, 800b a tool may be used to deflect the locking arm 730 of the gripping member into a second position, as shown in FIG. 9. In the second position, the locking arm 730 is defected so that the head portion 740 is pushed away, against the biasing action of the locking arm 730, to disengage from the recess behind the arrow-head profile of the longitudinal rail 300. For a panel that is mounted to a vertical wall or ceiling, once part of the locking arm 730 has been deflected at one position (preferably close to the top of a vertically-mounted panel) the weight of the panel is sufficient to pull the panel away from the longitudinal member 300 along the entire length of the gripping member 700. Where two panels are mounted side by side, as shown in FIG. 1, a small gap between adjacent panels 800a, 800b is sufficient to allow a blade of a tool, such as a screwdriver to be inserted between the panels 800a, 800b to deflect the gripping member 700.

Many different types of materials used to manufacture any of the components of the panel-mounting system described above. For example, the lateral and longitudinal rails 200, 300 and the gripping member 700 may be formed as extruded sections of metal, such as aluminium or steel, or of plastics materials. Similarly, the connector 100 may be formed of metal or of a plastics material. The particular materials chosen will depend on the type of panel mounting application. Where the panels are to be used for exterior cladding on buildings, for example, or for interior fire-resistant surfaces, then the components may be made from suitable fire-resistant materials such as steel.

Some of the components, for example the connector 100, may be formed using an additive manufacturing process. A common example of additive manufacturing is 3D printing; however, other methods of additive manufacturing are available. Rapid prototyping or rapid manufacturing are also terms which may be used to describe additive manufacturing processes.

As used herein, "additive manufacturing" refers generally to manufacturing processes wherein successive layers of material(s) are provided on each other to "build-up" layer-by-layer or "additively fabricate", a three-dimensional component.

Additive manufacturing methods described herein enable manufacture to any suitable size and shape with various features which may not have been possible using prior manufacturing methods. Additive manufacturing can create complex geometries without the use of any sort of tools, molds or fixtures, and with little or no waste material. Instead of machining components from solid billets of plastic or metal, much of which is cut away and discarded, the only material used in additive manufacturing is what is required to shape the part.

Suitable additive manufacturing techniques in accordance with the present disclosure include, for example, Fused Deposition Modeling (FDM), Selective Laser Sintering (SLS), 3D printing such as by inkjets and laserjets, Sterolithography (SLA), Direct Selective Laser Sintering (DSLS), Electron Beam Sintering (EBS), Electron Beam Melting (EBM), Laser Engineered Net Shaping (LENS), Electron Beam Additive Manufacturing (EBAM), Laser Net Shape Manufacturing (LNSM), Direct Metal Deposition (DMD), Digital Light Processing (DLP), Continuous Digital Light Processing (CDLP), Direct Selective Laser Melting (DSLM), Selective Laser Melting (SLM), Direct Metal Laser Melting (DMLM), Direct Metal Laser Sintering (DMLS), Material Jetting (MJ), NanoParticle Jetting (NPJ), Drop On Demand (DOD), Binder Jetting (BJ), Multi Jet Fusion (MJF), Laminated Object Manufacturing (LOM) and other known processes.

The additive manufacturing processes described herein may be used for forming components using any suitable material. For example, the material may be plastic, metal, composite, concrete, ceramic, polymer, epoxy, photopolymer resin, or any other suitable material that may be in solid, liquid, powder, sheet material, wire, or any other suitable form or combinations thereof.

Additive manufacturing processes typically fabricate components based on three-dimensional (3D) information, for example a three-dimensional computer model (or design file), of the component.

Accordingly, examples described herein not only include products or components as described herein, but also methods of manufacturing such products or components via additive manufacturing and computer software, firmware or hardware for controlling the manufacture of such products via additive manufacturing.

The structure of one or more parts of the product may be represented digitally in the form of a design file. A design file, or computer aided design (CAD) file, is a configuration file that encodes one or more of the surface or volumetric configuration of the shape of the product. That is, a design file represents the geometrical arrangement or shape of the product.

Design files can take any now known or later developed file format. For example, design files may be in the Stereolithography or "Standard Tessellation Language" (.stl) format which was created for stereolithography CAD programs of 3D Systems, or the Additive Manufacturing File (.amf) format, which is an American Society of Mechanical Engineers (ASME) standard that is an extensible markup-language (XML) based format designed to allow any CAD software to describe the shape and composition of any three-dimensional object to be fabricated on any additive manufacturing printer.

Further examples of design file formats include AutoCAD (.dwg) files, Blender (.blend) files, Parasolid (.x_t) files, 3D Manufacturing Format (0.3mf) files, Autodesk (3ds) files, Collada (.dae) files and Wavefront (.obj) files, although many other file formats exist.

Design files can be produced using modelling (e.g. CAD modelling) software and/or through scanning the surface of a product to measure the surface configuration of the product.

Once obtained, a design file may be converted into a set of computer executable instructions that, once executed by a processor, cause the processor to control an additive manufacturing apparatus to produce a product according to the geometrical arrangement specified in the design file. The conversion may convert the design file into slices or layers that are to be formed sequentially by the additive manufacturing apparatus. The instructions (otherwise known as geometric code or "G-code") may be calibrated to the specific additive manufacturing apparatus and may specify the precise location and amount of material that is to be formed at each stage in the manufacturing process. As discussed above, the formation may be through deposition, through sintering, or through any other form of additive manufacturing method.

The code or instructions may be translated between different formats, converted into a set of data signals and transmitted, received as a set of data signals and converted to code, stored, etc., as necessary. The instructions may be an input to the additive manufacturing system and may come from a part designer, an intellectual property (IP) provider, a design company, the operator or owner of the additive manufacturing system, or from other sources. An additive manufacturing system may execute the instructions to fabricate the product using any of the technologies or methods disclosed herein.

Design files or computer executable instructions may be stored in a (transitory or non-transitory) computer readable storage medium (e.g., memory, storage system, etc.) storing code, or computer readable instructions, representative of the product to be produced. As noted, the code or computer readable instructions defining the product that can be used to physically generate the object, upon execution of the code or instructions by an additive manufacturing system. For example, the instructions may include a precisely defined 3D model of the product and can be generated from any of a large variety of well-known computer aided design (CAD) software systems such as AutoCAD®, TurboCAD®, DesignCAD 3D Max, etc. Alternatively, a model or prototype of the component may be scanned to determine the three-dimensional information of the component.

Accordingly, by controlling an additive manufacturing apparatus according to the computer executable instructions, the additive manufacturing apparatus can be instructed to print out one or more parts of the product. These can be printed either in assembled or unassembled form. For instance, different sections of the product may be printed separately (as a kit of unassembled parts) and then subsequently assembled. Alternatively, the different parts may be printed in assembled form.

In light of the above, embodiments include methods of manufacture via additive manufacturing. This includes the steps of obtaining a design file representing the product and instructing an additive manufacturing apparatus to manufacture the product in assembled or unassembled form according to the design file. The additive manufacturing apparatus may include a processor that is configured to automatically convert the design file into computer executable instructions for controlling the manufacture of the product. In these embodiments, the design file itself can automatically cause the production of the product once input into the additive manufacturing device. Accordingly, in this embodiment, the design file itself may be considered computer executable instructions that cause the additive manufacturing apparatus to manufacture the product. Alternatively, the design file may be converted into instructions by an external computing system, with the resulting computer executable instructions being provided to the additive manufacturing device.

Given the above, the design and manufacture of implementations of the subject matter and the operations described in this specification can be realized using digital electronic circuitry, or in computer software, firmware, or hardware, including the structures disclosed in this specification and their structural equivalents, or in combinations of one or more of them. For instance, hardware may include processors, microprocessors, electronic circuitry, electronic components, integrated circuits, etc. Implementations of the subject matter described in this specification can be realized using one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

Although additive manufacturing technology is described herein as enabling fabrication of complex objects by building objects point-by-point, layer-by-layer, typically in a vertical direction, other methods of fabrication are possible and within the scope of the present subject matter. For example, although the discussion herein refers to the addition of material to form successive layers, one skilled in the art will appreciate that the methods and structures disclosed herein may be practiced with any additive manufacturing technique or other manufacturing technology.

The invention claimed is:

1. A connector for connecting a lateral rail to a longitudinal rail, the connector comprising:
    a first portion configured to attach to the lateral rail; and
    a second portion configured to attach to the longitudinal rail, the second portion extending perpendicularly from the first portion to form an L-shape with the first portion, the second portion comprising a first retaining lip for engagement with a first corresponding feature of the longitudinal rail,
    wherein the connector is rotatable between an unlocked orientation, in which the first portion may be freely inserted and removed from the lateral rail, and a locked orientation, in which the first portion is secured to the lateral rail, and
    wherein the second portion further comprises a first tongue, and wherein the first tongue is resiliently deformable in a direction of a main plane of the first portion.

2. The connector in accordance with claim 1, wherein the connector is slidable along the lateral rail in the locked orientation.

3. The connector in accordance with claim 1, wherein the connector is slidable along the longitudinal rail.

4. The connector in accordance with claim 1, wherein the first portion comprises a curved edge.

5. The connector in accordance with claim 1, wherein the first retaining lip is located at an edge of the first tongue that is distal from the first portion.

6. The connector in accordance with claim 5, wherein the first tongue is resiliently biased in a direction of the first retaining lip.

7. The connector in accordance with claim 5, wherein the second portion comprises a second tongue having a second retaining lip on an opposite side of the second portion to the first retaining lip for engagement with a second corresponding feature of the longitudinal rail.

8. The connector in accordance with claim 7, wherein the second retaining lip is located at an edge of the second tongue that is distal from the first portion.

9. The connector in accordance with claim 7, wherein the second tongue is resiliently biased in the direction of the second retaining lip.

10. The connector in accordance with claim 1, wherein the second portion comprises one or more slots configured to receive one or more flanges of the lateral rail when the connector is in the locked orientation.

11. The connector in accordance with claim 1, wherein the connector comprises a tab extending parallel to the first portion to form a T-shape with the first portion and the second portion.

12. A rail system comprising:
    a lateral rail configured to be secured to a wall;
    a connector according to claim 1; and
    a longitudinal rail configured to be connected to the lateral rail by means of the connector.

13. The rail system in accordance with claim 12, wherein the lateral rail comprises a substantially C-shaped cross-section, with an open face and a closed face.

14. The rail system in accordance with claim 12, wherein the lateral rail comprises one or more flanges extending laterally along the lateral rail and protruding at least partially across the open face.

15. The rail system in accordance with claim 12, wherein the connector is insertable into the interior of the cross-section when in the unlocked orientation.

16. The rail system in accordance with claim 12, wherein the corresponding feature of the longitudinal rail comprises a longitudinal recess extending along the length of the longitudinal rail and wherein the first retaining lip and/or the second retaining lip are configured to engage with the longitudinal recess thereby securing the connector to the longitudinal rail.

17. A panel-mounting system comprising:
    a rail system according to claim 16; and
    a panel extending laterally and having a gripping member extending along a longitudinal length of the panel,
    wherein the gripping member is configured to secure the panel to the longitudinal rail.

* * * * *